(12) United States Patent
Pajukoski et al.

(10) Patent No.: US 7,450,671 B2
(45) Date of Patent: Nov. 11, 2008

(54) INTERFERENCE CANCELLATION METHOD IN RADIO SYSTEM

(75) Inventors: Kari Pajukoski, Oulu (FI); Kari Horneman, Oulu (FI); Jukka Nuutinen, Oulu (FI)

(73) Assignee: Nokia Corporation, Espoo (FI)

( * ) Notice: Subject to any disclaimer, the term of this patent is extended or adjusted under 35 U.S.C. 154(b) by 804 days.

(21) Appl. No.: 10/321,712

(22) Filed: Dec. 18, 2002

(65) Prior Publication Data
US 2003/0176169 A1  Sep. 18, 2003

(30) Foreign Application Priority Data
Dec. 27, 2001  (FI) .................................. 20012581

(51) Int. Cl.
*H04B 7/10* (2006.01)
(52) U.S. Cl. ..................................... 375/347
(58) Field of Classification Search ................. 375/347, 375/316, 267, 148; 455/562.1
See application file for complete search history.

(56) References Cited
U.S. PATENT DOCUMENTS

| | | | |
|---|---|---|---|
| 5,812,542 A * | 9/1998 | Bruckert et al. ............. 370/335 |
| 5,901,187 A | 5/1999 | Iinuma | |
| 5,978,690 A | 11/1999 | Das et al. | |
| 6,470,194 B1 * | 10/2002 | Miya et al. ................ 455/562.1 |
| 2002/0041202 A1 * | 4/2002 | Katz et al. ................... 329/311 |
| 2003/0123565 A1 * | 7/2003 | Fukuda et al. .............. 375/267 |
| 2004/0208258 A1 * | 10/2004 | Lozano et al. .............. 375/295 |

FOREIGN PATENT DOCUMENTS

| | | |
|---|---|---|
| EP | 0 896 440 A3 | 2/1999 |
| GB | 2 257 605 A | 1/1993 |

* cited by examiner

*Primary Examiner*—Khai Tran
(74) *Attorney, Agent, or Firm*—Squire, Sanders & Dempsey L.L.P.

(57) ABSTRACT

A receiver in a radio system, comprising one or more antennas (600A to 600B) for receiving a signal including signal components descriptive of a signal to be detected and an interfering signal. The receiver comprises means for measuring (614A to 614B) the antenna-specific reception power of the received signal and means for weighting (614A to 614B) the signal received in each antenna by a antenna-specific weighting coefficient proportional to the reception power of said signal.

25 Claims, 4 Drawing Sheets

INTERFERENCE CANCELLATION METHOD IN RADIO SYSTEM

BACKGROUND OF THE INVENTION

1. Field of the Invention

The invention relates to an interference cancellation method in a radio system.

2. Description of the Related Art

In mobile systems, information is transferred between a mobile network and a mobile station by means of data transmission resources. The data transmission resources of a mobile network are specified in different manners depending on the multiple access method of the system. In radio networks employing the frequency division multiple access method (FDMA), users are distinguished from each other based on the frequency used. In radio networks employing the time division multiple access method (TDMA), several users are able to communicate in the same frequency band, in which the users are temporally distinguished from each other by the division of the information transmitted or received by the users into timeslots. In radio systems using the code division multiple access method (CDMA), several transmitting and receiving stations communicate in the same radio spectrum frequency band simultaneously. For the duration of the connection, a spreading code is reserved for each user, with which the user spreads the information included in a baseband signal. The receiver of the signal, in turn, is able to identify the information transmitted by the user by despreading it using the spreading code. A radio system may also be implemented by combining multiple access methods, for instance in a hybrid system based on the TDMA and CDMA multiple access methods, users communicating in each timeslot are distinguished from each other by means of spreading codes.

None of the above described multiple access methods guarantees an ideal and noise-free radio connection between users and a mobile network. For instance in the TDMA system, users communicating in adjacent timeslots and adjacent cells of the mobile system interfere with each other. The drawback in the CDMA system, in turn, is that the users operating in the same frequency band interfere with each other's transmissions due to cross correlation between spreading codes. In addition to the interference caused by users to each other, the signal is distorted on the radio path due to the shapes of the surrounding terrain, for example. Multipath propagation refers to a user signal being reflected from several different targets when propagating, thus generating several components, delayed in different manners, from the same signal in a receiver. Multipath-propagated components of a signal may be subjected to fading for instance when the signal is reflected from two objects that are close to one another. When fading is significant, the signal cannot be received at all. Interference in a radio transmission may also be caused by another radio system operating in an adjacent or even the same frequency band, which is due to an increasing number of users and the subsequent more effective utilization of the frequency ranges. An example of such a solution is placing second and third generation mobile networks in the same frequency band.

Placing mobile networks in the same frequency band often means that the desired signal has to be received in a very noisy environment. For instance in a radio system employing the CDMA multiple access method, a RAKE receiver based on reception via at least one antenna is used in a base station. In this case it is to be expected that fadings in different antennas do not correlate with each other. In a RAKE type of CDMA receiver, multipath propagation may be utilized by receiving several components, delayed in different manners, and combining them to obtain the best identification of a user signal. A RAKE receiver is composed of correlation branches (fingers), each of which receives a multipath-propagated component. The impulse response may be measured for instance by means of a matched filter (MF), from which a delay profile may be generated. A matched filter is used on information received for instance on a pilot channel or in the pilot sequence of a radio burst. Pilot symbols are a number of symbols known to the receiver and the transmitters, allowing the receiver to generate an estimate of the quality of the radio channel used. A matched filter calculates the convolution between the received signal and the spreading code for instance at intervals of ½ chip. In this way an impulse response pattern is generated for the multipath-propagated components of the received radio channel, the pattern including information on the signal power and the delays of the multipath-propagated components.

Several methods are known for combining signals received via different antennas, such as the IRC (interference rejection combining) method and the MRC (maximum ratio combining) methods. In IRC, the signals received via different antennas are weighted by complex weighting coefficients that are set based on the spatial characteristics of the received interfering signal. In the MRC method, the weighting coefficients are selected such that the signal-to-noise ratio, i.e. the power ratio between the desired signal and the interfering signal, is maximized. In a known method, the MMSE (minimum mean squared error) method is used in selecting the weighting coefficients, and the differences between the training sequence received in the signal and the bit sequence received in the receiver are compared, and said differences are minimized.

The performance of prior art solutions for combining signals received via different antennas is not sufficient. They are also difficult to implement in a receiver.

SUMMARY OF THE INVENTION

The object of the invention is thus to provide an improved and simplified method for interference cancellation in a radio system. This is achieved by a method of receiving a signal in a radio system, the method comprising receiving a signal including signal components descriptive of a signal to be detected and an interfering signal, using at least one antenna in a receiver. The method comprises measuring the antenna-specific reception power of the received signal; and weighting the signal received in each antenna by a weighting coefficient proportional to the reception power of said signal.

The invention also relates to a receiver in a radio system, comprising one or more antennas for receiving a signal including signal components descriptive of a signal to be detected and an interfering signal. The receiver comprises means for measuring the antenna-specific reception power of the received signal; and means for weighting the signal received in each antenna by a antenna-specific weighting coefficient proportional to the reception power of said signal.

The invention thus relates to a method and a receiver for receiving a radio signal in a communication system. Herein, a communication system means a radio system, such as a mobile telephone system. In an embodiment, the inventive solution is directed to situations where two communication systems operate in the same radio frequency band. Such a situation arises for instance when the second generation GSM1900 (Global System for Mobile Communication) system and the third generation UMTS (Universal Mobile Telephony System) systems both operate in a frequency range of about 1900 MHz. For example, if the communication system under study is UMTS, in the context of the present application, a signal of said system is called a signal to be detected, and the GSM signal would then be called an interfering signal. It is apparent that an interfering signal may, however, also include for instance signals of users communicating in other cells of the system descriptive of the desired signal. However, the implementation of the invention is not restricted to two different communication systems being used in the same frequency band, but the method is also applicable to situations when the frequency band is reserved for the use of only one system.

The receiver of the radio system is preferably a RAKE type of receiver implementing antenna diversity and in which a separate RAKE branch can be allocated to the reception of each multipath-propagated signal component. The receiver of the invention is preferably implemented in a base station of a mobile system, where antenna diversity is most practical to implement. The invention can also be implemented in a terminal enabling antenna diversity.

The signal to be detected is preferably a spread spectrum signal according to the WCDMA (Wideband CDMA) system and includes user signals spread by several spreading codes of different users. Said system may also be a hybrid system, such as a system employing both the code division and time division multiple access methods. In the receiver of the invention, a spread spectrum signal is received in one or more antennas. In the inventive solution, the reception power of a signal is measured antenna-specifically. In the inventive solution, signals received in different antennas are weighted by an antenna-specific weighting coefficient, which depends on the reception power of the signal received via said antenna. In a receiver implemented with one receive antenna, weighting mainly refers to the temporal weighting of symbol estimates, whereby advantages are gained for instance in channel coding. In a receiver having several antennas, weighting refers to the weighting of signals received from the different receive antennas. In an embodiment, besides weighting signals received via different antennas, temporal weighting of symbol estimates may also be carried out in a receiver having multiple antennas. The weighting can be carried out in several stages of signal processing, such as before despreading, after despreading, after channel estimation or after the restoration of user signals. In a preferred embodiment, the weighting coefficient is the reciprocal of the antenna-specific reception power of the signal. Preferably, antennas are weighted for instance at symbol pace or at timeslot pace, although the invention is not restricted to the weighting pace used.

In a preferred embodiment of the invention, the power ratio between the desired signal and an interfering signal is measured, and weighting by the reciprocal is applied only if the power ratio is below a given threshold value. For example, −20 dB can be set as the threshold value, i.e. the power ratio WCDMA/GSM is at least −20 dB.

The solution implementing the invention is simple compared with prior art solutions, which bring about technical software and/or hardware savings in the design of the receiver. Furthermore, the inventive solution gains significant advantages in signal reception for instance in very noisy situations, wherein the power ratio of the interfering signal compared with the signal to be detected is significant, for instance more than −20 dB. The performance of a conventional receiver dramatically weakens as the interference worsens, whereas the inventive solution allows a relatively stable performance to be achieved regardless of the noisiness of the reception situation.

BRIEF DESCRIPTION OF THE DRAWINGS

In the following, the invention will be described in greater detail in connection with preferred embodiments with reference to the accompanying drawings, in which.

DETAILED DESCRIPTION OF THE PREFERRED EMBODIMENT(S)

Figure 1:
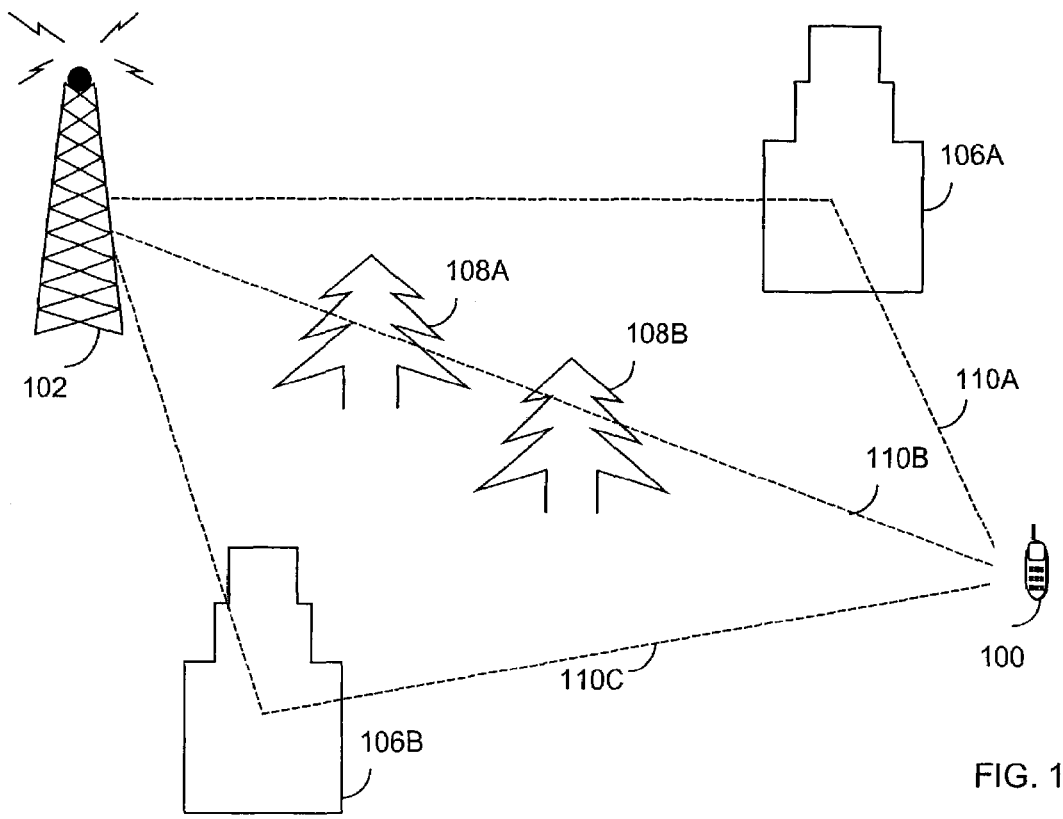
FIG. 1 shows multipath propagation of a radio signal between a mobile station and a base station.

The invention will be described next with reference to the accompanying figures. FIG. 1 shows a terminal 100 communicating with a base station 102 of a mobile network using a bi-directional radio connection. Data transmission between the terminal 100 and the base station 102 takes place on radio channels constituting the radio connection. The radio connection is interfered with for instance because of attenuation of the radio signal due to a distance 110B between the terminal 100 and the base station 102. Furthermore, the signal weakens due to shading when encountering terrestrial shapes, such as trees 108A to 108B. When being reflected from buildings 106A to 106B or the like, the signal generates multipath-propagated components 110A, 110C of the signal in the receiver.

The general structure of a radio system will be described next with reference to FIG. 3. Since second-generation radio systems and third generation radio systems and their various hybrids, i.e. so-called $2.5^{th}$ generation radio systems are in global use and continuously being developed, the embodiments are described in a radio system illustrated in FIG. 3 and comprising network elements of different generations in parallel. In the description, the representative of a second-generation radio system is GSM (General System for Mobile Communications) and that of a $2.5^{th}$ generation radio system a radio system based on GSM and using the EDGE technology (Enhanced Data Rates for Global Evolution) for increasing the data transmission rate and usable also for implementing packet transfer in the GPRS system (General Packet Radio System). In the figure, the representative of a third generation radio system is a radio system known at least by the names IMT-2000 (International Mobile Telecommunications 2000) and UMTS (Universal Mobile Telecommunications System). However, the embodiments are not restricted to these systems described by way of example, but it is apparent to a person skilled in the art that the invention is also applicable to other radio systems having corresponding characteristics.

Figure 3:
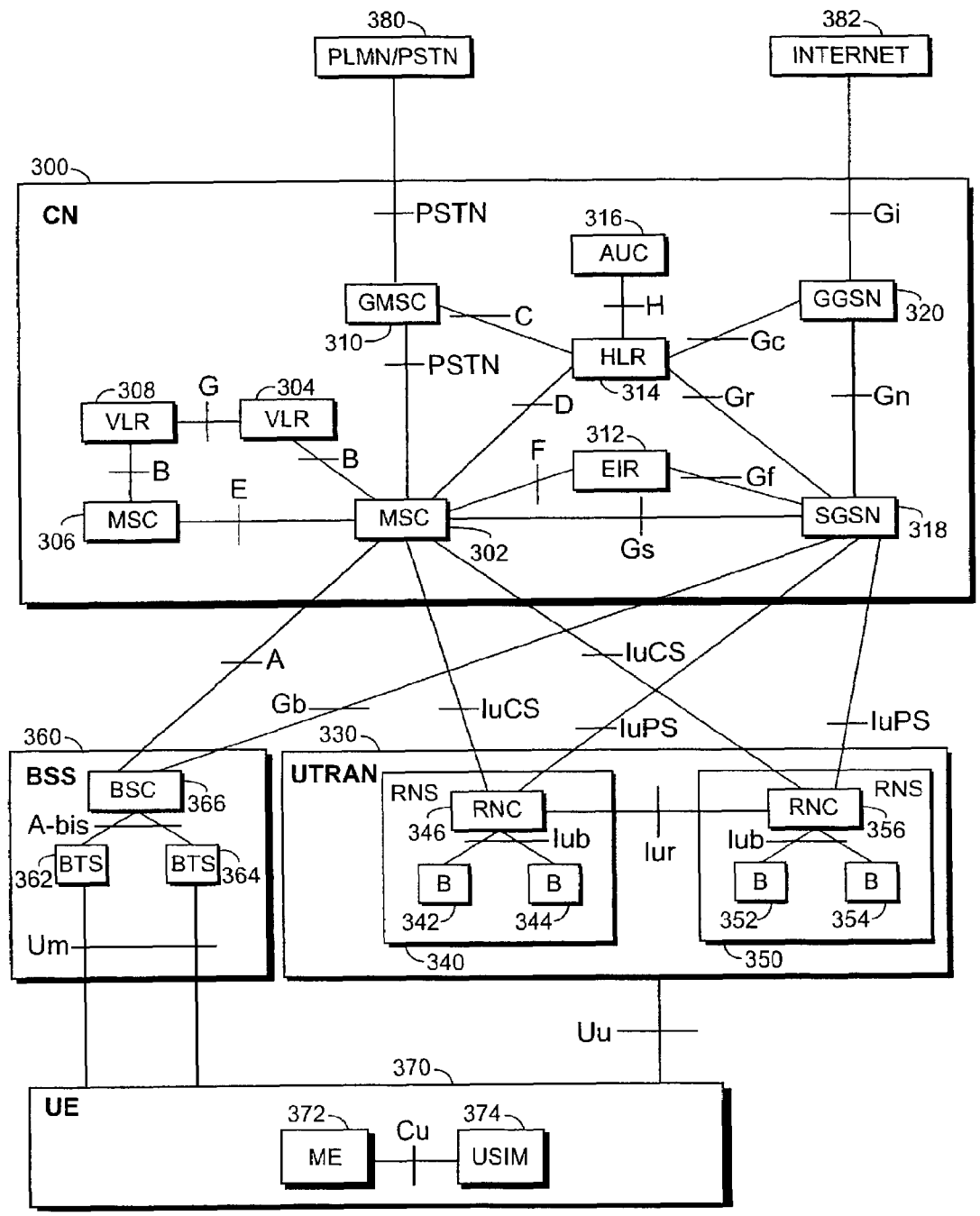
FIG. 3 is a simplified block diagram of a radio system.

FIG. 3 is a simplified block diagram showing the most important parts of a radio system at network element level and the interfaces between them. The structure and functions of the network elements are not described in any detail since they are generally known. The main parts of a radio system include a core network (CN) 300, a radio access network 330 and user equipment (UE) 370. UTRAN (UMTS Terrestrial Radio Access Network), i.e. the radio access network 330, belongs to the third generation and is implemented by the wideband code division multiple access technology (WCDMA). The figure also shows a base station system 160, which belongs to the 2/2.5 generation and is implemented by the time division multiple access method (TDMA).

In general terms, a specification may be presented stating that a radio system is composed of user equipment, also called a terminal, a subscriber terminal and a mobile telephone, and of a network part, which comprises all fixed infrastructure of the radio system, i.e. the core network, the radio access network and the base station system.

The structure of the core network 300 corresponds to the combined structure of the GSM and GPRS systems. GSM network elements answer for the implementation of circuit-switched connections, and GPRS network elements for the implementation of packet-switched connections; however, some network elements are included in both systems. A mobile services switching center (MSC) 302 is the core of the circuit-switching side of the core network 300. The same mobile services switching center 302 can be used to serve the connections of both the radio access network 330 and the base station system 360. The tasks of the mobile services switching center 302 include for instance connection switching, paging, user equipment location registration, handover management, collecting subscriber billing information, encryption parameter management, frequency allocation management and echo cancellation.

The number of mobile services switching centers 302 may vary; a small network operator may have only one mobile services switching center 302, but there may be several of them in large core networks 300. FIG. 3 shows a second mobile services switching center 306, but its connections to the other network elements are not described for the sake of clarity.

Large core networks 300 may comprise a separate gateway mobile service switching center (GMSC) 310 that attends to the circuit-switched connections between the core network 300 and external networks 380. The gateway mobile service switching center 310 is located between the mobile services switching centers 302, 306 and the external networks 380. The external network 380 may be for instance a public land mobile network (PLMN) or a public switched telephone network (PSTN).

A home location register (HLR) 314 comprises a permanent subscriber register, i.e. for instance the following data: an international mobile subscriber identity (IMSI), a mobile subscriber ISDN number (MSISDN), an authentication key, and, when the radio system supports GPRS, a PDP address (PDP=Packet Data Protocol). A visitor location register (VLR) 304 includes roaming-related information on the user equipment 370 in the area of the mobile services switching center 302. The visitor location register 304 includes to a large degree the same information as the home location register 314, but the visitor location register 304 includes said information only temporarily. An equipment identity register (EIR) 312 includes the international mobile equipment identities (IMEI) of the user equipment 370 employed in the radio system, and a so-called white list, and optionally a black list and a gray list. An authentication center (AuC) 316 is always physically located in the same place as the home location register 314 and includes a subscriber authentication key Ki and the corresponding IMSI.

The network elements shown in FIG. 3 are functional entities whose physical implementation may vary. Usually, the mobile services switching center 302 and the visitor location register 304 constitute one physical device, and the home location register 314, the equipment identity register 312 and the authentication center 316 another physical device. A serving GPRS support center (SGSN) 318 is the core of the packet-switching side of the core network 300. The main task of the serving GPRS support node 318 is to transmit and receive packets with the user equipment 370 supporting packet-switched transfer by using the radio access network 330 or the base station system 360. The serving GPRS support node 318 includes subscriber data and location data on the user equipment 370. A gateway GPRS support node (GGSN) 320 is the counterpart on the packet-switching side of the gateway mobile service switching center 310 on the circuit-switching side; however, with the exception that the gateway GPRS support node 320 also has to be able to route traffic outgoing from the core network 300 to external networks 382, whereas the gateway mobile service switching center 310 only routes incoming traffic. In our example, the representative of the external networks 382 is the Internet.

The base station system 360 is composed of a base station controller (BSC) 366 and base transceiver stations (BTS) 362, 364. The base station controller 366 controls the base transceiver station 362, 364. In principle, the aim is to place the devices implementing the radio path and the related functions in the base transceiver station 362, 364, and to place the control devices in the base station controller 366. The base station controller 366 attends for instance to the following tasks: base transceiver station 362, 364 radio resource management, intercell handover, frequency management, i.e. frequency allocation to base transceiver stations 362, 364, frequency hopping sequence management, uplink time delay measurement, implementation of operation and maintenance interface, and power control. A base transceiver station 362, 364 comprises at least one transceiver that implements one carrier, i.e. eight timeslots, i.e. eight physical channels. Typically, one base transceiver station 362, 364 serves one cell, but a solution is feasible where one base transceiver station 362, 364 serves several sectorial cells. The diameter of a cell may vary from some meters to tens of kilometers. The base transceiver station 362, 364 is also perceived to comprise a transcoder for conversion between the speech coding format employed in the radio system and the speech coding format employed in the public telephone network. However, in practice, the transcoder is always physically located in the mobile services switching center 302. The tasks of the base transceiver station 362, 364 include for example the following: calculation of TA (timing advance), uplink measurements, channel coding, encryption, decryption, and frequency hopping.

The radio access network 330 contains radio network subsystems 340, 350. Each radio network subsystem 340, 350 is composed of radio network controllers (RNC) 346, 356 and nodes B 342, 344, 352, 354. Node B is quite an abstract concept, and the term base station is often used instead. The functionality of the radio network controller 340, 350 corresponds approximately to the base station controller 366 of the GSM system, and node B 342, 344, 352, 354 to the base transceiver station 362, 364 of the GSM system. Solutions are also available, where the same device is both a base station and node B, i.e. said device simultaneously implements both the TDMA and the WCDMA radio interface.

The user equipment 370 is composed of two parts: mobile equipment (ME) 372 and an UMTS subscriber identity module (USIM) 374. The GSM system naturally uses the system's own identity module. The user equipment 370 comprises at least one transceiver for implementing a radio connection to the radio access network 330 or to the base station system 360. The user equipment 370 may comprise at least two different subscriber identity modules. The user equipment 370 also comprises an antenna, a user interface and a battery.

The USIM 374 includes user-related information, and particularly data related to information security, for example an encryption algorithm.

FIG. 3 also shows the interfaces between the network elements, which are, however, not described in detail herein.

The operation of a radio system employing the code division multiple access method will be described next on a general level. In CDMA systems, the data symbols of each user are multiplied by a pseudorandom spreading code, whereby the data signal to be transmitted is spread into a wide frequency band. A spreading code is usually composed of a long bit sequence, its bit rate being much higher than that of the data signal. During a connection, each user has at his disposal one or more spreading codes, which are allocated to the user during connection set-up. Several users transmit simultaneously in the same frequency band and the data signals are distinguished from each other in receivers based on said spreading code. The aim is to select orthogonal spreading codes, whereby the interference caused by transmissions of different users to each other is minimal. However, the signals of different users interfere with each other in the receiver, since the spreading codes are not completely orthogonal, particularly due to a phase shift caused by the propagation delay. The WCDMA system also employs a so-called scrambling code for multiplying the spread user signal. In uplink, i.e. in communication from a terminal to a base station, users are distinguished based on the scrambling code. In downlink, i.e. in communication from a base station to terminals, base stations are distinguished by the scrambling codes.

Information transfer between a base station and terminals, such as mobile telephones, occurs on radio channels, which in the WCDMA system thus means a combination of a spreading code used in a given frequency band and optionally a scrambling code. In the CDMA, uplink and downlink can be distinguished for instance by means of frequency division duplex (FDD), in which case uplink and downlink are in different frequency ranges, or by means of time division duplex (TDD), in which case the directions of transmission are temporally distinguished from each other.

Figure 5:
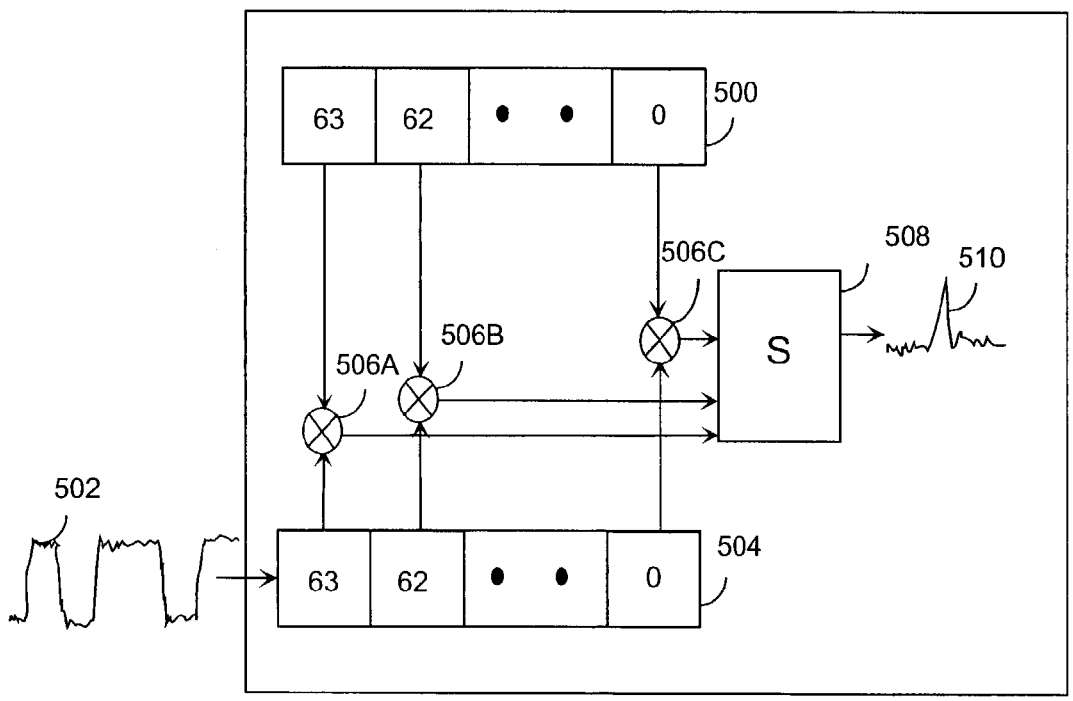
FIG. 5 shows the operational principle of a matched filter.

Transmission on radio channels takes place in frame structures of a specified form, which include for instance pilot symbols, user data and control information. Pilot symbols are a set of symbols known to both the terminals and the base stations. Based on the pilot symbols, the receiver generates a channel impulse response, based on which the phase shift caused by the channel to the received complex-valued symbol is found out. The pilot symbols are compared with the received signal in a matched filter (MF) matched to the spreading code and illustrated in FIG. 5. FIG. 5 shows a matched filter 500 divided into 64 parts descriptive of 64 units, i.e. chips, of a spreading code. A signal sample, generated by the user's spreading code from the pilot symbols, is stored in the matched filter 500. A corresponding 64-chip long signal sample 504 is generated from a received combination signal 502. The signal sample 504 is correlated one chip at a time with the signal sample comprised by the matched filter 500. The generated correlation values are added up in an adder 410, as whose output is obtained an impulse response pattern 412, in which the components having different reception powers are shown differently delayed. The matched filter searches for the best value for an adder 508. A finger is allocated based on the impulse response in the receiver, for instance a RAKE type of receiver, for the best signal components.

In signal reception, a typical problem in a radio system is fading; the reception power profile showing fading dips, i.e. breaks, which impede the reception of information. Fading is caused for instance by unfavorable summing inside the multipath-propagated components. One manner of protection against fading is interleaving, which means that the information to be transmitted is divided into parts that are interleaved over a longer time span. In interleaving, successive bits are shifted as long from each other as possible. In channel coding, in turn, the information to be transmitted is coded by a known method, allowing the channel coding to be decoded in a receiver to infer the content of the information lost in a fading dip. A spread spectrum signal may also be received in the receiver in two or more antennas, whereby signal loss in one antenna due to fading is not yet crucial to the reception of information.

Figure 4:
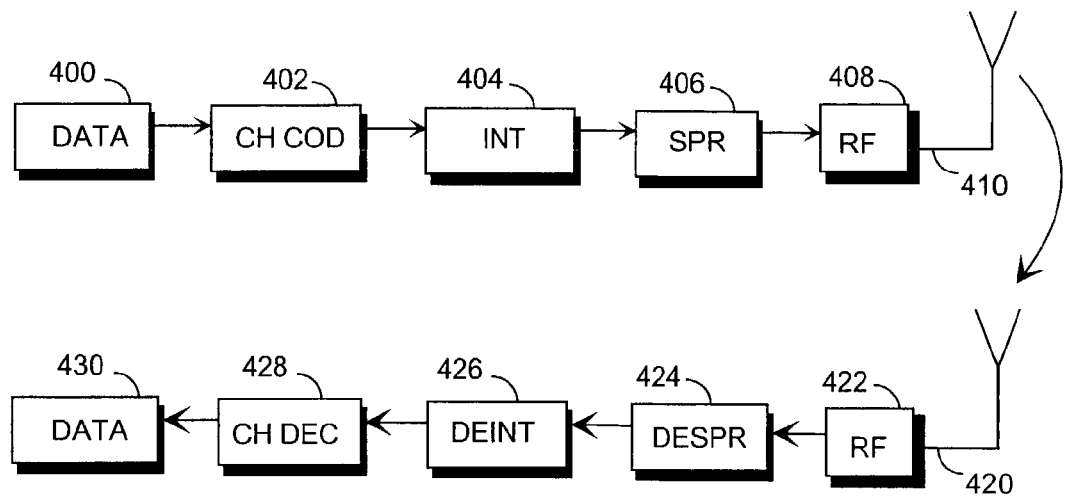
FIG. 4 shows an embodiment of the structure of a CDMA transmitter and receiver.

FIG. 4 generally describes the operation of a radio transmitter-radio receiver pair in a WCDMA mobile system. The radio transmitter may be located in a base station or in a subscriber terminal, and the radio receiver also in a subscriber terminal or in a base station. The upper part of FIG. 4 shows the basic functions of a radio transmitter and the lower part the general structure of the functions performed on the data to be transmitted by the radio transmitter. The information 400 to be transmitted is coded in a channel coder 402 for instance by block coding or convolution coding. However, the pilot bits to be transmitted are not channel coded, since the intention is to find out the distortions caused to the signal by the channel. After channel coding, the information is interleaved in an interleaver 404. In interleaving, the bits of different services are mixed together in a special manner, whereby a transient fading on the radio path does not necessarily yet render the transferred information unidentifiable. The interleaved bits are spread by a spreading code in block 406. Finally, the combined signal is applied to radio frequency parts 410, which may comprise different power amplifiers and filters for restricting the bandwidth. An analog radio signal is transmitted to the radio path via an antenna 410.

An analog radio-frequency signal is received from the radio path by an antenna 420. The signal is applied to radio frequency parts 422, which comprise for instance a filter for preventing frequencies outside the desired frequency band. The received signal is despread in block 424 and deinterleaved in deinterleaving means 426. The channel coding used in the transmission is decoded in a channel decoding block 428, whereupon the received data 430 are, in an optimal situation, identical to the transmitted data 400.

Figure 2:
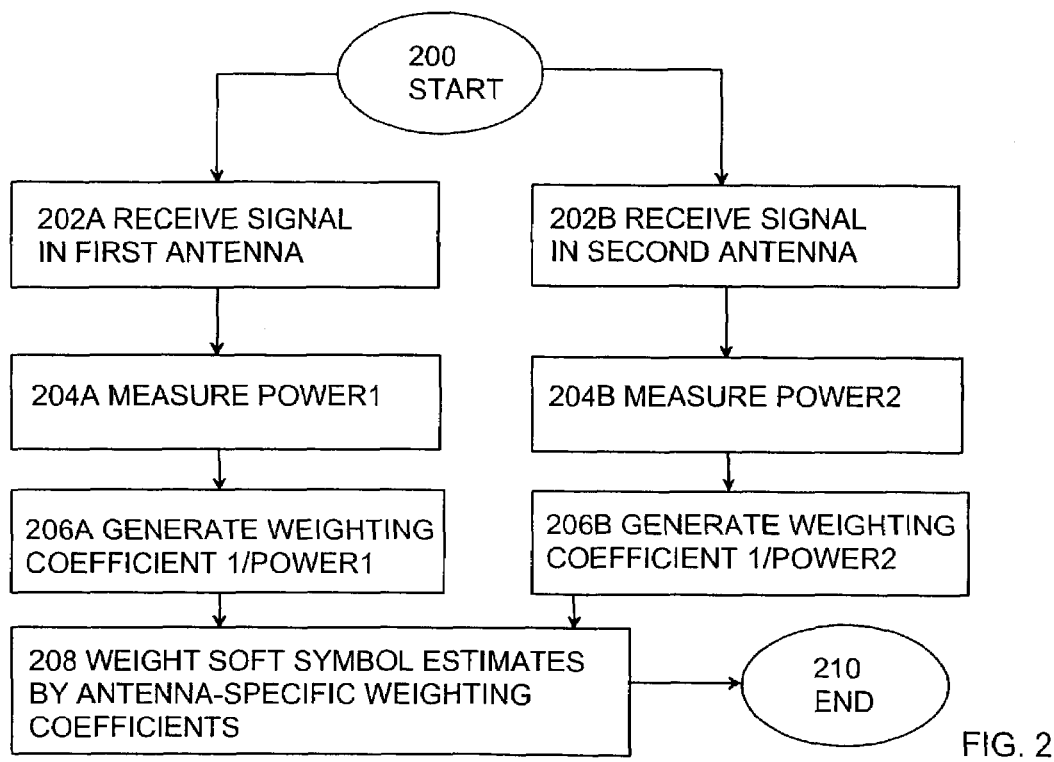
FIG. 2 shows a preferred embodiment of the method of the invention.

In the following, the invention will be described by means of a preferred embodiment with reference to FIG. 2. The inventive method is preferably intended for situations where signal reception is carried out under very noisy circumstances. Such a situation may arise for instance when two different radio networks operate in the same frequency range. An example is a situation where WCDMA and GSM networks both use a frequency range of about 1900 MHz. The assumption in the method shown in FIG. 2 is that the signal to be received, i.e. the desired signal, is a WCDMA signal. In a base station of the WCDMA network, the signal is received in at least one antenna in the manner shown by method steps 202A and 202B. The reception power of the received signal can be measured directly from the signal received in the antenna, the signal including the signal to be detected and an interfering signal. The power can be calculated in the known manners shown in steps 204A to 204B, for instance by calculating the square of the signal amplitude. In method steps 206A to 206B, antenna-specific weighting coefficients are generated by taking the reciprocal of the antenna-specific power of the received signal. In the receiver, the signals received via the different antennas are directed to different RAKE branches for monitoring. The channel distortion directed to the pilot symbols is also otherwise taken into account in signal reception. Preliminary symbol estimates, so-called soft symbol estimates, are generated from the symbols received via each antenna branch. A soft symbol estimate means that an estimate of the reliability of the reception is associated with each received symbol, such as 0 or 1. The resolution of the estimate may be as desired, for example 8 or 32-level. For example, when an 8-level scale is used, reliability value 0 would mean a certain symbol value 0, value 6, in turn, a quite certain 1. The reliability estimate is generated based on the behavior of the phase and amplitude of the received signal towards the assumed value. Method step 208 involves weighting the soft symbol estimates by the generated antenna-specific weighting coefficients. Weighting means that if the antenna-specific reception power of a given antenna is high, the effect of said antenna is reduced by multiplying the signal received via the antenna by a low weighting coefficient, such as the reciprocal of the reception power, for example. This is because since the antenna-specific reception power is high, it is also obvious that the antenna-specific interference power is high. Similarly, if the antenna-specific signal reception power is low, and thus the antenna-specific interference power is low, too, a signal received via said antenna is weighted more in final signal reception. The inventive method is not restricted to how often the weighting coefficients are calculated, but according to a preferred embodiment, the method steps shown in FIG. 2 are always carried out in connection with the generation of the impulse response. In a typical CDMA system, the impulse response is generated at intervals of a few milliseconds. The weighting coefficients are preferably calculated at symbol pace. The calculation may also be implemented faster, however preferably less frequently than at chip pace, in order for the calculation to remain reliable. For example in the case of TDMA interference, the optimal weighting frequency would be for instance the same as the length of a TDMA timeslot.

Figure 6:
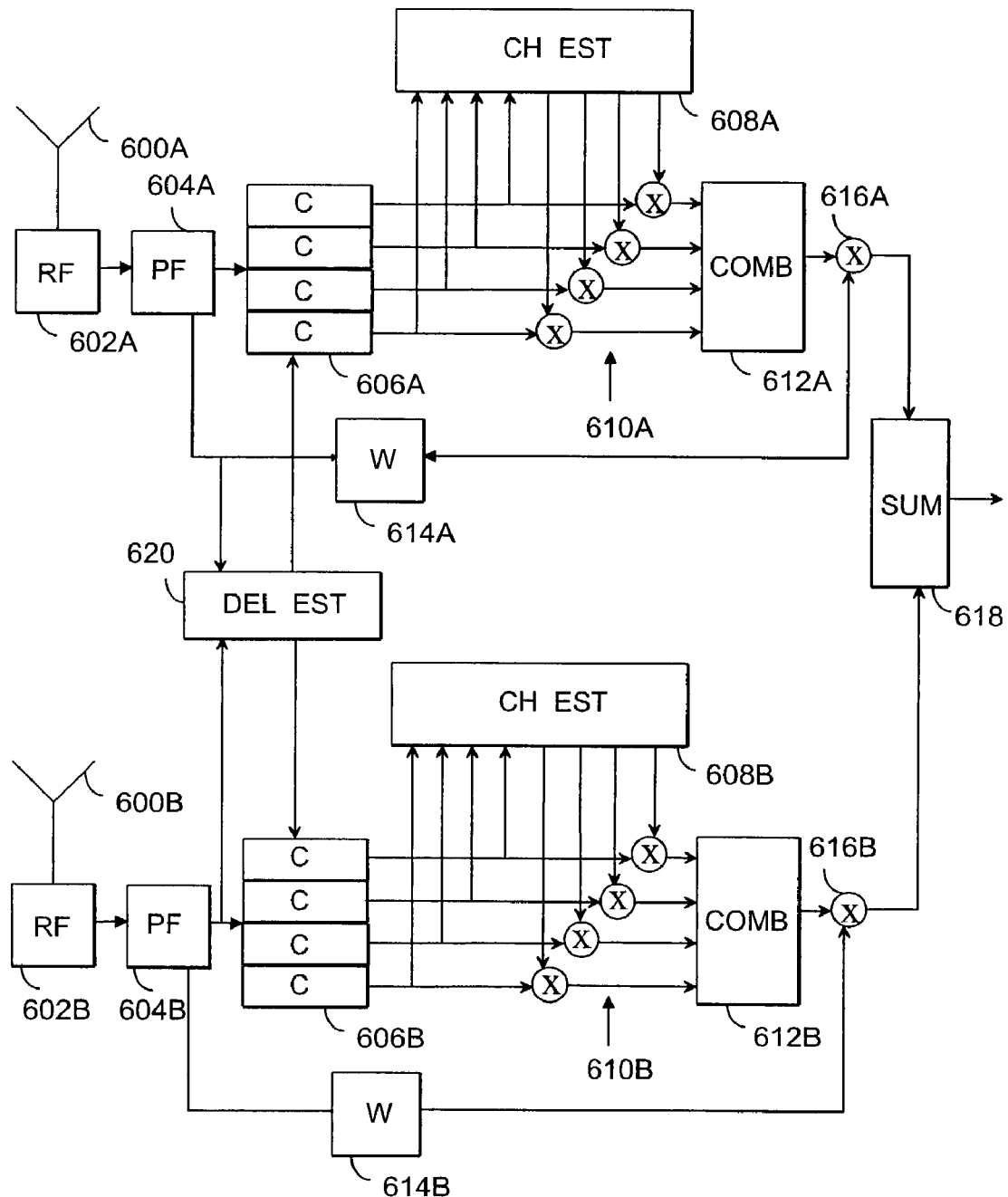
FIG. 6 shows a preferred embodiment of the receiver of the invention.

FIG. 6 shows a receiver according to a preferred embodiment of the invention, located for instance in a base station of a mobile network. Two antennas 600A and 600B receive a signal. From radio frequency parts 602A, 602B, signals are applied to pulse modulation filters 604A, 604B, adapted in transmission pulse format, by means of which a signal of the desired system can be distinguished from signals outside the desired frequency band. The power of the obtained narrow-band signal can be used as a power approximation of the received signal and, accordingly, of the interfering signal, since, in practice, the power of the signal to be detected is very low compared with that of the interfering signal. The power of the received signal is generated antenna-specifically, allowing the signals received in the different antennas to be weighted in the receiver in the desired manner. A signal component descriptive of a filtered signal is applied to means for despreading 606A, 606B user signals from the received signal, the means for despreading being implemented for instance as a correlator bank. In the correlator banks 606A to 606B, a correlator generates the user's spreading code for each significant user signal delay component. The signal components despread in the correlator banks 606A to 606B are applied to channel estimators 608A, 608B, wherein preliminary symbol estimates are generated user signal-specifically based on the information provided by the pilot symbols. The user signals are restored based on the preliminary symbol estimates on the basis of the distortion information provided by the channel estimator using means for restoring 610A, 610B user signals based on the channel estimates to generate restored user signals. The obtained signals are combined with means for combining 612A, 612B the restored user signals to generate a restored signal to be detected. The user signal to be detected is transferred to multipliers 616A and 616B, which also serve as means for determining the reception power of the signal to be detected. In addition, weighting coefficient information is applied to the multipliers 616A, 616B from means 614A and 614B for weighting the signal received in each antenna by an antenna-specific weighting coefficient that is proportional to the reception power of said antenna.

In a preferred embodiment, the means for weighting 614A to 614B receive output information from the filters 604A, 604B, matched to the transmission pulse, and generate the measurement of the power of the signal received in the antenna from the information. The device units 614A to 614B thus also comprise means for measuring the antenna-specific reception power of a received signal, i.e. the means for measuring 614A measure the reception power of the signal received in antenna 600A, and the means for measuring 614B measure the reception power of the signal received in antenna 600B. The means for weighting 614A to 614B preferably obtain feedback information from the multipliers 616A to 616B about the power of the signal to be detected, whereby the means for weighting are able to generate the signal-to-noise ratio as a relation of the powers of the signal to be detected and the received signal. Consequently, the means for weighting 614A to 614B are able to perform weighting of the antenna-specific signal depending on the signal-to-noise ratio such that if the signal-to-noise ratio is weaker than a preset threshold value, the received signal is weighted. From the multipliers 616A and 616B, the signals are applied to an adder 618, which combines the signals received via the different antennas, the signals being weighted by a weighting coefficient depending on the reception power of the received signal. Although FIG. 6 shows that the signal to be multiplied by a weighting coefficient is a signal obtained as the output of the combiner, the multiplication by the weighting coefficient can also be performed in another step. The multiplication by the weighting coefficient can thus also be performed for instance on the output of the correlators or channel estimator or on restored user signals.

The means in the receiver, such as the means for weighting, for example, are preferably implemented by software using a general-purpose processor of the receiver. The means described in connection with the specification of the preferred embodiments can also be implemented using hardware solutions providing the required functionality, for instance as ASIC (Application Specific Integrated Circuit) or utilizing separate logics components.

Although the invention is described above with reference to the example according to the accompanying drawings, it is apparent that the invention is not limited thereto, but can be modified in a variety of ways within the scope of the inventive idea disclosed in the attached claims.

The invention claimed is:

1. A method, comprising:
    receiving a signal including signal components descriptive of a signal to be detected and an interfering signal;
    measuring an antenna-specific reception power of the received signal; and
    weighting the received signal by an antenna-specific weighting coefficient proportional to the reception power of said signal.
    wherein the antenna-specific weighting coefficient is the reciprocal of the reception power of the signal.

2. A method as claimed in claim 1, wherein the received signal is weighted time-dependently by the weighting coefficient proportional to the reception power of the signal.

3. A method as claimed in claim 1, further comprising:
comparing the reception power of the signal to be detected with the reception power of the interfering signal to generate a signal-to-noise ratio,
wherein an antenna-specific signal to be detected is weighted by the weighting coefficient proportional to the reception power only if the signal-to-noise ratio is below a preset threshold value.

4. A method as claimed in claim 1, wherein the method is performed substantially at symbol pace.

5. A method as claimed in claim 1, wherein the interfering signal is at least partly generated by a second radio system operating in the same frequency band as the radio system.

6. A method as claimed in claim 1, wherein the signal to be detected is a wideband code division multiple access signal and the interfering signal is at least partly generated by a second system operating in the same frequency band as the wideband code division multiple access system.

7. A method, comprising:
receiving a signal including signal components descriptive of a signal to be detected and an interfering signal using at least one antenna in a receiver;
measuring an antenna-specific reception power of the received signal;
weighting the received signal by a weighting coefficient proportional to the reception power of said signal;
despreading user signals from the received signal;
generating user-specific channel estimates from the despread user signals;
restoring user signals based on the channel estimates to generate restored user signals; and
forming a restored detection signal based on the restored user signals,
wherein the weighting proportional to the antenna-specific reception power is directed to one or more of the following signals: a spread signal to be detected, despread user signals, user-specific channel estimates, restored user signals, a restored signal to be detected.

8. An apparatus, comprising:
a receiver configured to receive a signal including signal components descriptive of a signal to be detected and an interfering signal;
a measuring unit configured to measure an antenna-specific reception power of the received signal; and
a weighting unit configured to weight the received signal by an antenna-specific weighting coefficient proportional to the reception power of said signal,
wherein the antenna-specific weighting coefficient is the reciprocal of the reception power of the received signal.

9. An apparatus as claimed in claim 8, wherein the weighting unit is configured to weight the received signal time-dependently by the weighting coefficient proportional to the reception power of the signal.

10. An apparatus as claimed in claim 8, comprising:
determining unit configured to determine the reception power of the signal to be detected; and
comparing unit configured to compare the reception power of the signal to be detected with the reception power of the interfering signal to generate a signal-to-noise ratio,
wherein the weighting unit is further configured to weight the antenna-specific signal to be detected by the weighting coefficient proportional to the reception power only if the signal-to-noise ratio is below a preset threshold value.

11. An apparatus as claimed in claim 8, wherein the apparatus is configured to perform the weighting substantially at symbol pace.

12. An apparatus as claimed in claim 8, wherein the interfering signal is at least partly generated by a second radio system operating in the same frequency band as the radio system.

13. An apparatus as claimed in claim 8, wherein the signal to be detected is a wideband code division multiple access signal and the interfering signal is at least partly generated by a second system operating in the same frequency band as the wideband code division multiple access system.

14. The apparatus as claimed in claim 8, wherein the apparatus is a receiver.

15. An apparatus, comprising:
a receiver configured to receive a signal including signal components descriptive of a signal to be detected and an interfering signal;
a measuring unit configured to measure an antenna-specific reception power of the received signal;
a weighting unit configured to weight the received signal by an antenna specific weighting coefficient proportional to the reception power of said signal;
a despreading unit configured to despread user signals from the received signals;
a generator configured to generate channel estimates from the despread user signals;
a restoring unit configured to restore user signals based on the channel estimates to generate restored user signals; and
a combining unit configured to combine restored user signals to generate a restored signal to be detected,
wherein the weighting unit is further configured to direct a weighting proportional to the antenna-specific reception power to one or more of the following signals: a spread signal to be detected, despread user signals, user-specific channel estimates, restored user signals, a restored signal to be detected.

16. The apparatus as claimed in claim 15, wherein the apparatus is a receiver.

17. An apparatus, comprising:
receiving means for receiving a signal including signal components descriptive of a signal to be detected and an interfering signal in a radio system;
measuring means for measuring an antenna-specific reception power of the received signal; and
weighting means for weighting the received signal by a antenna-specific weighting coefficient proportional to the reception power of said signal,
wherein the antenna-specific weighting coefficient is the reciprocal of the reception power of the received signal.

18. A computer program embodied on a computer-readable medium comprising computer code for causing a computer to perform a method for receiving a signal in a radio system, the method comprising:
receiving a signal including signal components descriptive of a signal to be detected and an interfering signal;
measuring an antenna-specific reception power of the received signal; and
weighting the received signal by a weighting coefficient proportional to the reception power of said signal,
wherein the antenna-specific weighting coefficient is the reciprocal of the reception power of the received signal.

19. An apparatus, comprising:
at least one receiver configured to receive a signal including signal components descriptive of a signal to be detected and an interfering signal;
a measuring unit configured to measure an antenna-specific reception power of the received signal; and a weighting unit configured to weight the signal received in the receivers by a antenna-specific weighting coefficient proportional to the reception power of said signal, wherein the antenna-specific weighting coefficient is the reciprocal of the reception power of the signal received in said receiver.

20. The apparatus as claimed in claim 19, wherein the weighting unit is configured to weight the received signal time-dependently by the weighting coefficient proportional to the reception power of the signal.

21. The apparatus as claimed in claim 19, comprising:
a determining unit configured to determine the reception power of the signal to be detected; and
a comparing unit configured to compare the reception power of the signal to be detected with the reception power of the interfering signal to generate a signal-to-noise ratio,
wherein the weighting unit is further configured to weight the antenna-specific signal to be detected by the weighting coefficient proportional to the reception power only if the signal-to-noise ratio is below a preset threshold value.

22. An apparatus, comprising:
at least one receiver configured to receive a signal including signal components descriptive of a signal to be detected and an interfering signal;
a measuring unit configured to measure an antenna-specific reception power of the received signal;
a weighting unit configured to weight the signal received in the receivers by a antenna-specific weighting coefficient proportional to the reception power of said signal;
a despreading unit configured to despread user signals from the received signals;
a generator configured to generate channel estimates from the despread user signals;
a restoring unit configured to restore user signals based on the channel estimates to generate restored user signals; and
a combining unit configured to combine restored user signals to generate a restored signal to be detected,
wherein the weighting unit is further configured to direct a weighting proportional to the antenna-specific reception power to one or more of the following signals: a spread signal to be detected, despread user signals, user-specific channel estimates, restored user signals, a restored signal to be detected.

23. An apparatus, comprising:
receiving means for receiving a signal including signal components descriptive of a signal to be detected and an interfering signal;
measuring means for measuring an reception power of the received signal; and
weighting means for weighting the signal received in the receiving means by a antenna-specific weighting coefficient proportional to the reception power of said signal,
wherein the antenna-specific weighting coefficient is the reciprocal of the reception power of the signal received in said receiving means.

24. The apparatus as claimed in claim 23, wherein the weighting means is configured for weighting the received signal time-dependently by the weighting coefficient proportional to the reception power of the signal.

25. An apparatus, comprising:
receiving means for receiving a signal including signal components descriptive of a signal to be detected and an interfering signal;
measuring means for measuring an antenna-specific reception power of the received signal;
weighting means for weighting the signal received in the receivers by a antenna-specific weighting coefficient proportional to the reception power of said signal;
dispreading means for despreading user signals from the received signals;
generating means for generating channel estimates from the despread user signals;
restoring means for restoring user signals based on the channel estimates to generate restored user signals; and
combining means for combining restored user signals to generate a restored signal to be detected,
wherein the weighting means is further configured to direct a weighting proportional to the antenna-specific reception power to one or more of the following signals: a spread signal to be detected, despread user signals, user-specific channel estimates, restored user signals, a restored signal to be detected.

* * * * *